April 7, 1970   P. B. WEISZ   3,505,116
FUEL CELL AND METHOD OF OPERATION
Filed May 13, 1963

INVENTOR.
PAUL B. WEISZ
BY
ATTORNEY 3,505,116
FUEL CELL AND METHOD OF OPERATION
Paul B. Weisz, Media, Pa., assignor to Mobil Oil Corporation, a corporation of New York
Filed May 13, 1963, Ser. No. 279,827
Int. Cl. H01m 27/14, 27/00, 27/26
U.S. Cl. 136—86                          7 Claims

ABSTRACT OF THE DISCLOSURE

A cyclic method of operating a fuel cell comprising catalytically dehydrogenating a heated saturated cyclic hydrogen donor to produce hydrogen and a less saturated compound, consuming the hydrogen in the fuel cell and removing the less saturated compound from the fuel cell and at least partially hydrogenating it to produce said hydrogen donor and repeating the cycle.

---

This invention relates to fuel cells and to a method of operating them.

Among the various fuel cells heretofore described, those employing hydrogen as fuel have certain advantages based on the fact that hydrogen is one of the most electrochemically active fuels, and also on the fact that it produces more energy per unit weight, in terms of B.t.u./lb., than other commonly used fuels. Despite these advantages, its use is affected by a serious handicap in respect of the storage of the same to provide a practical fuel supply. The plain fact is that it is a difficult material to store. It requires compression, and after compression expensive high pressure containers are necessary. If stored in the gas phase, the containers are bulky; and if liquefied, the liquefaction costs become high such as to rule out the practical use of the fuel in many cases.

In response to these difficulties, the invention provides a means of supplying hydrogen to a fuel cell, as required by the cell operation, without the necessity for large storage space and/or containers for the hydrogen.

According to the invention, a dehydrogenatable liquid compound is supplied to the fuel electrode of a fuel cell, a dehydrogenation catalyst is incorporated in the electrode, and by controlling the temperature of the liquid compound during contact with the electrode, a catalytic dehydrogenation of the same may be effected so as to produce hydrogen in situ at the electrode. The electrode is also provided with a conventional catalytic material to catalyze conversion of the hydrogen fuel to an electrochemically active state. Thus, the hydrogen produced during the dehydrogenation reaction is adsorbed by the electrode and then converted to hydrogen atoms, the conversion taking place in or on the electrode, i.e., in the pores thereof. The hydrogen atoms may then be electrochemically oxidized at the fuel-electrode-electrolyte interface. The electrolyte suitably is a conventional ion-permeable material.

Figure 1:
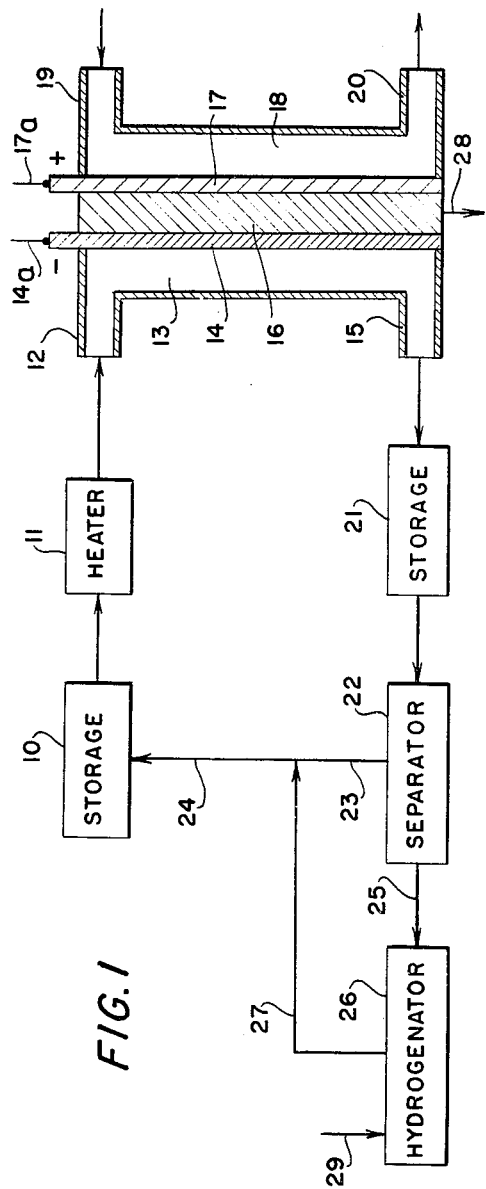
Figure 2:
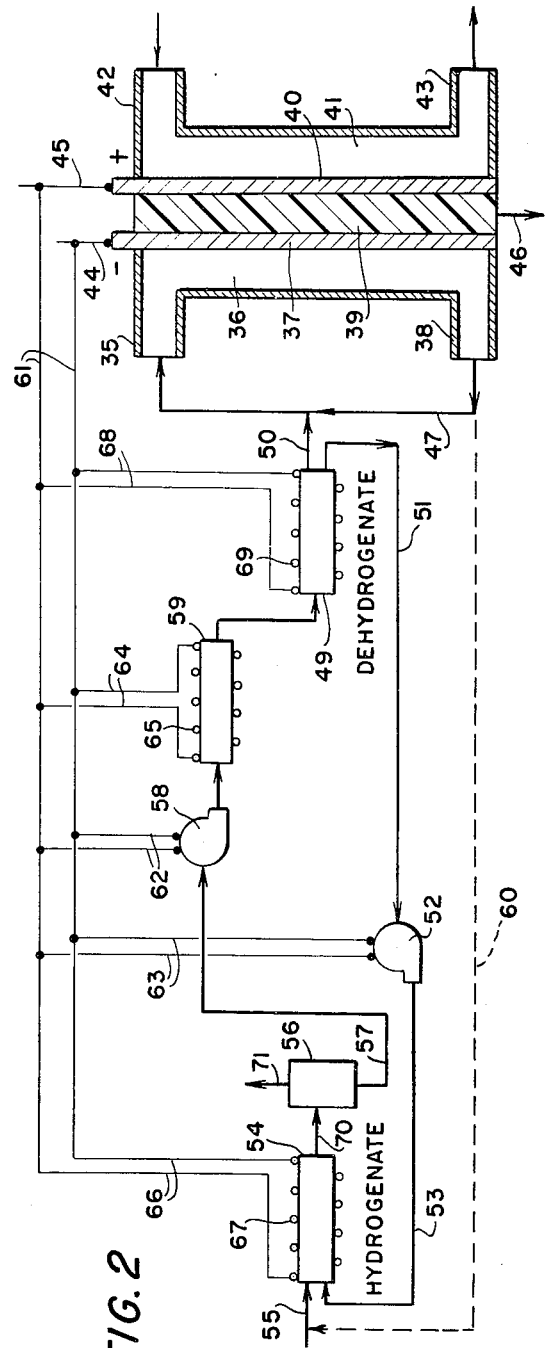

The invention may be illustrated by the drawings, which are diagrammatic, and in which FIG. 1 shows a fuel cell and associated flow system by means of which the invention may be practiced, and FIG. 2 shows a modification.

Referring to FIG. 1, the construction of the cell and flow system may be apparent from the ensuing description of its operation. Liquid dehydrogenatable compound, such as Tetralin, a preferred material, is drawn from storage reservoir 10, heated to a temperature ranging from room to about 400 or 450° C., preferably 200 to 300° C., by passage through heater 11, and passed by line 12 into fuel compartment 13 where it comes in contact with fuel electrode 14. The latter suitably may comprise a mixture of particles of dehydrogenation catalyst and fuel electrode catalyst, the particles being held in a suitable electron-conductive matrix or binder or on an electron-conductive support.

The hot Tetralin is dehydrogenated during contact with electrode 14, or rather with the dehydrogenation catalyst incorporated therein, and the resulting molecular hydrogen is adsorbed or chemisorbed by the electrode while the naphthalene product, being soluble in the Tetralin, is carried away by subsequent portions of Tetralin, which may be introduced to electrode 14 in some excess. Each chemisorbed molecule of hydrogen is split into two chemisorbed atoms by the action of the fuel electrode, and these are electrochemically oxidized with the production of one electron per hydrogen atom. The electrons are drawn off by electrode 14 and lead 14a to an external load not shown and thereafter pass through lead 17a to electrode 17. Oxidant such as oxygen or air is fed to oxygen electrode 17 through line 19 and the compartment 18, leaving the latter by line 20. Thus, as hydrogen is electrochemically oxidized at the fuel electrode 14, giving up electrons to the electrode, oxygen is reduced at the oxygen electrode 17, consuming electrons. Water is formed which may collect in the electrolyte 16 and be removed as by means of a drain 28 or other suitable device.

As indicated, the flow of Tetralin to the cell may be in some excess of the amount required to react to produce hydrogen, the excess being useful to dissolve and remove the naphthalene reaction product from the fuel electrode. This excess Tetralin containing dissolved naphthalene leaves the cell through line 15 and may be stored in the reservoir 21. The Tetralin may be recovered therefrom by separating naphthalene in zone 22, as by cooling the mixture until the naphthalene crystallizes out and then filtering, or by distillation, after which the Tetralin is recycled through lines 23 and 24 to storage 10. The separated naphthalene is withdrawn from zone 22 by line 25 and may be hydrogenated in zone 26 to Tetralin, which may then be recirculated through line 27 to join the Tetralin in line 24. The reaction in zone 26, to which hydrogen may be added by line 29, may be done conventionally using as catalyst nickel, platinum, nickel on a support, nickel and copper, etc. at temperatures around 200° C. and pressures of 100 to 200 p.s.i.; more vigorous hydrogenation with nickel or platinum black gives Decalin.

In the dehydrogenation reaction it may be advantageous to maintain a minimum vapor pressure of hydrogen in contact with the catalyst to prevent deactivation and prolong the life thereof. Typically, ratios of hydrogen to Tetralin or Decalin of 8:1 to 10:1 are suitable for this purpose. Pressures may be that prevailing in zone 26, or higher, going up to 500 p.s.i. or more.

It may be noted that while the dehydrogenation reaction involving Tetralin or Decalin is not thermodynamically favored at temperatures much below 200° C., the fact that one of the products of the reaction is removed (molecular hydrogen is adsorbed by the electrode and split to hydrogen atoms) makes this a coupled reaction in which the rate, though low, can be maintained. In other words, while the extent of the dehydrogenation reaction may not be large at lower temperatures, the reaction rate may yet be satisfactory owing to the existing coupled reaction in which hydrogen is immediately utilized for the fuel electrode processes. The advantage of the coupled reaction is particularly apparent where the hydrogen atoms are electrochemically oxidized in and/or on the fuel electrode by hydroxyl ions which travel across the electrolyte from the oxygen electrode. For this reason anion-permeable electrolytes comprise a preferred group.

At somewhat higher temperatures, i.e., 200 to 300° C., the dehydrogenation reaction rate is more rapid. It is of interest to note that with Decalin the dehydrogenation reaction produces 0.032 mole of hydrogen per cc. of Decalin, which is equivalent to a cc. of gaseous hydrogen at a pressure of 5800 p.s.i. On the same basis, Tetralin produces gaseous hydrogen at 20,000 p.s.i.

The fuel electrode is suitably a composite of a hydrogen-splitting catalyst for converting absorbed molecular hydrogen to hydrogen atoms and an electron-conductive support, and to this composite there is added a dehydrogenation catalyst for converting the Tetralin. The hydrogen-splitting catalyst may be conventional, comprising a Group VIII metal such as platinum, palladium, rhodium, iridium, ruthenium, nickel, and their alloys. Another catalyst is copper. A useful support is porous carbon, on which the hydrogen-splitting catalyst may be impregnated, coated, or soaked according to known methods. Other conventional porous supports include metal grids, gauzes, screens, or meshes on which finely divided metal catalysts may be applied as by sintering or by use of binders. Nickel and stainless steel are also useful supports, being available in porous forms.

The preferred dehydrogenation catalyst comprises a mixture of a metal and a metal hydride, with the metal being chosen from Group VIII metals such as platinum, palladium, and osmium, or from Group IV–B metals such as titanium, zirconium, and thorium, or uranium, and the metal hydride chosen from hydrides of one of the foregoing Group IV–B metals, or from palladium, tantalum, or uranium. Other suitable dehydrogenation catalysts are platinum, platinum on charcoal, platinum on alumina, palladium, nickel, nickel and alumina, copper, oxides of Group VI metals on charcoal. It may be apparent that those catalysts which are useful in combination with charcoal or carbon carriers may be particularly suitable with electrodes constructed of porous carbon supports.

In making the fuel electrode, the dehydrogenation catalyst in powder form may be mixed with the powdered hydrogen-splitting catalyst and the resulting mixture pressed about a porous support of the kind described, using suitable binders to hold the mass together, or sintering the powder mixture on the support. Or the mixture of catalytic powders may be pressed together and sintered, and then placed between a pair of metal gauze sheets which may function as electron-conductive supports. It may also be desirable to apply the dehydrogenation catalyst to a conventional fuel electrode, such as one comprising platinum black or palladium black on stainless steel, as by impregnating, coating, or soaking the electrode with the dehydrogenation catalyst in known manner. Regardless of the manner used to prepare the electrode, it is desirable to secure a concentration of dehydrogenation catalyst at or adjacent that side of the electrode which is in contact with the stream flowing in zone 13. The resulting composite electrode is preferably in the form of a thin sheet or plate having a thickness, say, of up to about ¼ inch. It is porous, with the pores extending through the electrode.

An opportunity exists for using one and the same catalyst, or component thereof, to influence both the dehydrogenation and the hydrogen-splitting reactions. As is apparent from the foregoing, such catalysts as platinum, palladium, nickel and copper are capable of catalyzing both reactions, so that a fuel electrode made of or incorporating these materials, or combinations thereof, represents a desirable form of electrode for use in the fuel cell.

The oxygen electrode is conventional, comprising a catalytically active metal like platinum, palladium, manganese or chromium on porous carbon. Other catalytic metals are silver and nickel. The electrode may also be in the form of a sintered mass of metal grains having a metal gauze disposed on each side of the mass to add strength.

Useful ion-conductive electrolytes include conventional aqueous solutions of acids and bases, such as aqueous solutions of sulfuric acid, hydrochloric acid, potassium hydroxide, etc., and also aqueous solutions of neutral salts. These aqueous electrolytes may require that the fuel cell be operated under pressure to maintain the electrolyte in the liquid phase, as will be understood. Still other electrolytes include solids like alkali carbonates, or alkaline earth carbonates; or a porous ceramic body soaked with an electrolyte, such as magnesia soaked with aqueous sodium carbonate solution. Conventional fused salt electrolytes are suitable, comprising carbonates of the alkali and/or alkaline earth metals, and if desired including halide salts of these metals. Also useful are ion-permeable resin membranes, described below in connection with FIG. 2, in those cases where the dehydrogenation temperature at electrode 14 is not so high as to impair the resin material.

It is desirable that the dehydrogenatable compound should be an organic compound which gives up hydrogen fairly easily, i.e., is an "easy hydrogen donor," by which is meant that it may be dehydrogenated under mild conditions to give a relatively good yield of hydrogen. It is also desirable, though not necessary, that the reaction product, other than hydrogen, should be hydrogenatable fairly easily so that a cycle may be established in which the hydrogen donor compound is dehydrogenated, the reaction product hydrogenated back to the compound, and so on. Suitable compounds which meet these desiderata are the hydronaphthalenes, such as Tetralin and Decalin, which are naphthalene hydrogenation products and dehydrogenatable by means of the catalysts described. Tetralin and Decalin have a further advantage in that they are solvents for the naphthalene reaction product, and thus are able to dissolve and remove it to present formation of solid residues on the electrode. Other suitable solvents for naphthalene are hot alcohol, ether, acetic acid, and dioxane, and these may be mixed with incoming Tetralin or Decalin or other dehydrogenatable compound.

Other dehydrogenatable alicyclic hydrocarbon compounds that may be employed are cycloheptane, cyclohexane, cyclopentane, cyclobutane, and cyclopropane, and including these compounds in partially saturated form although the fully saturated compounds are preferred. As is apparent, these are cycloalkanes and partially saturated cycloalkenes, which for convenience may be designated dehydrogenatable cycloparaffinic compounds. Alkyl-substituted cycloalkanes are also useful, particularly where the alkyl is methyl or lower alkyl. Other useful compounds are the at least partially saturated polycyclic aromatic compounds, as illustrated by the hydronaphthalenes already described and including hydroanthracenes, hydrophenanthrenes, and hydroindenes. Also useful are saturated or partially saturated cyclic hydrocarbon compounds having rings that are directly united, such as dicyclohexyl methane, dicyclohexyl, and dicyclohexyl ethane; also bridged hydrocarbon ring compounds like the bicyclohexanes and bicyclooctanes; and spiro hydrocarbon ring compounds like spiropentane and the spirodecanes. Another useful group is the cyclic terpene hydrocarbons such as pinene, dipinene, bornylene, camphene. Any of the foregoing may be substituted by alkyl groups, preferably methyl or lower alkyl. Suitable solvents for these compounds may be chosen from the cycloalkanes and hydronaphthalenes. While liquid dehydrogenatable compounds are preferred, solid compounds are also useful as they can be dissolved in the solvents.

Particularly useful compounds are those that are dehydrogenatable over a catalyst that also functions as a hydrogen-splitting catalyst in the fuel electrode, several of which catalysts have been noted.

For purposes of classification, the dehydrogenatable compounds described may be designated alicyclic paraffinic or hydrocarbon compounds since they all contain one or more rings and are at least partially saturated. All are capable of being dehydrogenated over the type of catalysts set forth and at temperatures up to about 400 to 450° C. The compounds may have various substituent groups provided the latter do not interfere with the dehydrogenation of the compounds and the subsequent hydrogenation step.

In FIG. 2 a modified process is shown in which advantage is taken of a cyclic system for dehydrogenating an easy hydrogen donor compound like Tetralin or Decalin to make hydrogen, and in which the resulting naphthalene is hydrogenated to form Tetralin, the latter dehydrogenated, and so on. The system may be disposed immediately adjacent a fuel cell so that the hydrogen may pass by short connecting lines to and from the fuel inlet of the cell; the hydrogenation zone, however, may be disposed at any distance from the dehydrogenation zone, although suitably it is closely adjacent the same.

As shown, the fuel cell is substantially the same as in FIG. 1, comprising a fuel inlet line 35, fuel compartment 36, porous fuel electrode 37, fuel outlet 38, electrolyte 39, oxygen electrode 40, oxygen compartment 41 with inlet and outlet lines 42 and 43. Electrical leads 44 and 45 are provided and also the drain 46 for removing water from the electrolyte. It will be understood that the fuel electrode 37 may be of the conventional type, that is, it does not incorporate a special catalyst for dehydrogenating the Tetralin in situ.

Suitably the electrolyte may comprise an ion-permeable membrane, which may be cation- or anion-permeable and which is conventionally obtainable; or which may be prepared by the copolymerization of resin-forming compounds, one of which has an ionizable acidic substituent such as sulfonic acid or carboxyl radicals or an ionizable basic substituent such as amine or quaternary ammonium groups; or a resin polymer may be reacted with an ionic compound to introduce thereto ionizable substituents. A typical cation exchange resin is polystyrene sulfonic acid, or a resin formed by copolymerizing a phenolsulfonic acid with formaldehyde; in the resulting resin the hydrogen ion of the sulfonic acid radical is mobile and replaceable. The hydrogen ion of the ion exchange resin may be replaced by a metallic cation such as an alkali or alkaline earth metal. A typical anion exchange resin is a copolymerized mixture of phenol, formaldehyde, and triethylenetetramine. Commercially available ion exchange membranes are those designated "Amberplex C–1" which has sulfonic acid groups, "Amberlite IRC–50" which contains carboxyl groups, "Dowex-50," a sulfonated copolymer of styrene and divinylbenzene, and "Amberplex A–1" which has hydroxyl groups. The membranes are preferably as thin as practical, ranging from 0.001 to 0.5 inch, and may be formed from the resin by casting the latter into the form of a sheet, or by incorporating granules of the resin in a matrix comprising a binder such as polyethylene.

Hydrogen enters the fuel compartment 36 of the cell through line 35 and is supplied to the fuel electrode 37 where the usual electrode processes take place, i.e., the hydrogen is chemisorbed by the electrode, then split, and then the electrode acts to catalyze the electrochemical oxidation of the hydrogen. Any excess hydrogen in compartment 36 leaves the cell by line 38 and passes through line 47 to the hydrogen feed inlet 35.

Hydrogen is produced in dehydrogenation zone 49 by dehydrogenating an at least partially saturated cyclic compound of the kind described, preferably Tetralin, using the catalysts and conditions described above, and the resulting hydrogen in heated state is passed by line 50 to line 35. Naphthalene from zone 49, preferably dissolved in Tetralin which may comprise unreacted Tetralin or specially added Tetralin, is removed through line 51 by pump 52 and sent by line 53 to the hydrogenation zone 54 where hydrogenation is carried out in the manner described for FIG. 1. Hydrogen for carrying out the reaction is introduced through line 55. Effluent from zone 54 may be passed to zone 56, from which Tetralin may be removed through line 57 by pump 58 and sent to heat exchanger 59 for temperature adjustment, after which it passes to zone 49.

If the rate of hydrogen flow through the fuel cell is high, it is possible to recycle excess hydrogen through line 60 to line 55 as well as through line 47 to line 35. It will be understood that this recycle is optional.

Current from the fuel cell may be used in part to operate electric motors for pumps 52 and 58, the motors being shown integrally with the pumps. For this purpose leads 61, 62, and 63 are shown. Also, electric power for heating the heat exchanger 59 may be drawn from the fuel cell through leads 61 and 64, the latter being shown connected to an electrical heating coil 65; and similarly, power may be supplied through leads 61 and 66 for the heating coil 67 in or on zone 54, and through leads 61 and 68 for the heating coil 69 in or on zone 49. In these applications, it will be understood that a plurality of fuel cell units will be operatively connected together, although for the sake of a simplified showing the drawing illustrates only one. In this connection, the motors for operating the pumps may suitably be DC motors, forming a fuel cell-DC motor system having good efficiency. Another advantage of this system is that conventional voltage controllers, or starting boxes comprising large resistors, are not required during starting of the motor, as the voltage in fuel cell circuits is usually acceptable. Available voltages in these circuits are also suitable for motor speed control; and it is possible to have variable speed control by connecting a number of fuel cells in series with the motor, and using a contact controller so that as many cells as desired can be cut into the circuit. Thus, if each cell supplies 1 volt, and 50 or 100 cells are connected in series, it is possible to control the voltage to the motor through 50 or 100 steps. The system is also capable of supplying varying currents. For example, if large currents are required by the motor at less than full voltage, provision may be made for switching a number of cells in parallel to give higher currents at low voltages. If required, AC power may be produced by means of a suitable inverter, such as a conventional motor-generator set comprising a DC motor driving an AC generator.

The flow of FIG. 2 is further suitable for an operation in which an impure hydrogen gas stream, comprising hydrogen and one or more impurities such as hydrogen sulfide, methane, ethane, other low molecular weight gaseous hydrocarbons, etc., is introduced to the system through line 55. In zone 54 the hydrogen content of this stream is utilized to hydrogenate naphthalene to Tetralin or Decalin, which leaves by line 70 and is employed as already described, with the resulting pure hydrogen from zone 49 being fed to the fuel cell. The impurities in the inlet hydrogen stream in line 55 are such that they do not react in zone 54 and may be removed by line 71. In this way hydrogen may be abstracted, so to speak, from admixture with the impurities and made available in pure form for the fuel cell. Suitable impure hydrogen streams include reformer gas, reformer cycle gas, city gas, water gas, natural gas, producer gas, etc. The advantages of this operation may be realized even though no hydrogen is recycled, as by lines 47 and 60, and even though no current from the fuel cell is used within the process.

It will be seen that with the flow of FIG. 2, only pure hydrogen is passed to the fuel electrode of the fuel cell, the naphthalene and Tetralin or Decalin circulation being confined to zones 49 and 54. Yet there is no need to store or transport large quantities of hydrogen. These advantages are present whether pure or impure hydogen is delivered through line 55 to zone 54, and whether or not hydrogen and/or electric current are fed back from the fuel cell.

It will be understood that the invention is capable of obvious variations without departing from its scope.

In the light of the foregoing descriptions, the following is claimed:

1. A cyclical method of operating a fuel cell having fuel and oxygen electrodes spaced apart by an electrolyte and wherein said fuel electrode contains a dehydrogenation catalyst and a hydrogen-splitting catalyst, which comprises bringing a heated hydrogen donor comprising an at least partially saturated dehydrogenatable cyclic compound into contact with the fuel electrode and dehydrogenating the same thereat to produce hydrogen and a compound less saturated than said donor, absorbing the hydrogen in the fuel electrode and splitting the same to form adsorbed hydrogen atoms, electrochemically oxidizing the hydrogen atoms to produce electrons, removing said less saturated compound from the fuel electrode, at least partially hydrogenating said less saturated compound, and returning said partially saturated dehydrogenatable cyclic compound to said fuel electrode to continue the cyclical method.

2. The method of claim 1 wherein said hydrogen donor is selected from the group consisting of Tetralin or Decalin.

3. The method of claim 2 which comprises heating said hydrogen donor to a temperature in the range of about 200 to about 400° C.

4. Method of claim 1 wherein said less saturated compound is removed from the fuel electrode by washing with a solvent.

5. Method of claim 4 wherein said hydrogen donor is liquid and serves as said solvent.

6. A cyclical method of operating a fuel cell having fuel and oxygen electrodes spaced apart by an electrolyte, wherein hydrogen is electrochemically oxidized to produce electrons, wherein said fuel electrode contains a hydrogen-splitting catalyst, and wherein storage of hydrogen is substantially avoided, which comprises catalytically dehydrogenating a heated hydrogen donor comprising an at least partially saturated dehydrogenatable cyclic compound to produce hydrogen and a compound less saturated than said donor, absorbing the hydrogen in the fuel electrode and catalytically splitting the same to form adsorbed hydrogen atoms, electrochemically oxidizing the hydrogen atoms to produce electrons, removing said less saturated compound from the fuel electrode and at least partially hydrogenating the same to form said hydrogen donor, and catalytically dehydrogenating said last mentioned hydrogen donor to produce hydrogen and said less saturated compound and thus to continue the cyclical method.

7. Method of claim 6 wherein said catalytic dehydrogenation step is conducted outside the fuel cell.

References Cited

UNITED STATES PATENTS

| | | | |
|---|---|---|---|
| 3,148,089 | 9/1964 | Oswin | 136—86 |
| 3,201,282 | 8/1965 | Justi et al. | 136—86 |
| 3,236,693 | 2/1966 | Caesar | 136—86 |
| 3,250,646 | 5/1966 | Hipp | 136—120 |
| 2,384,463 | 9/1945 | Gunn et al. | 136—86 |
| 3,306,706 | 2/1967 | Schuman | 23—210 |
| 2,328,828 | 9/1943 | Marshner | 23—212 XR |
| 3,262,816 | 7/1966 | Lindholm. | |

WINSTON A. DOUGLAS, Primary Examiner

H. A. FEELEY, Assistant Examiner